May 20, 1958     J. E. WEBB     2,835,064
TOY OR DECOY BIRD OR ANIMAL
Filed July 24, 1956     2 Sheets-Sheet 1
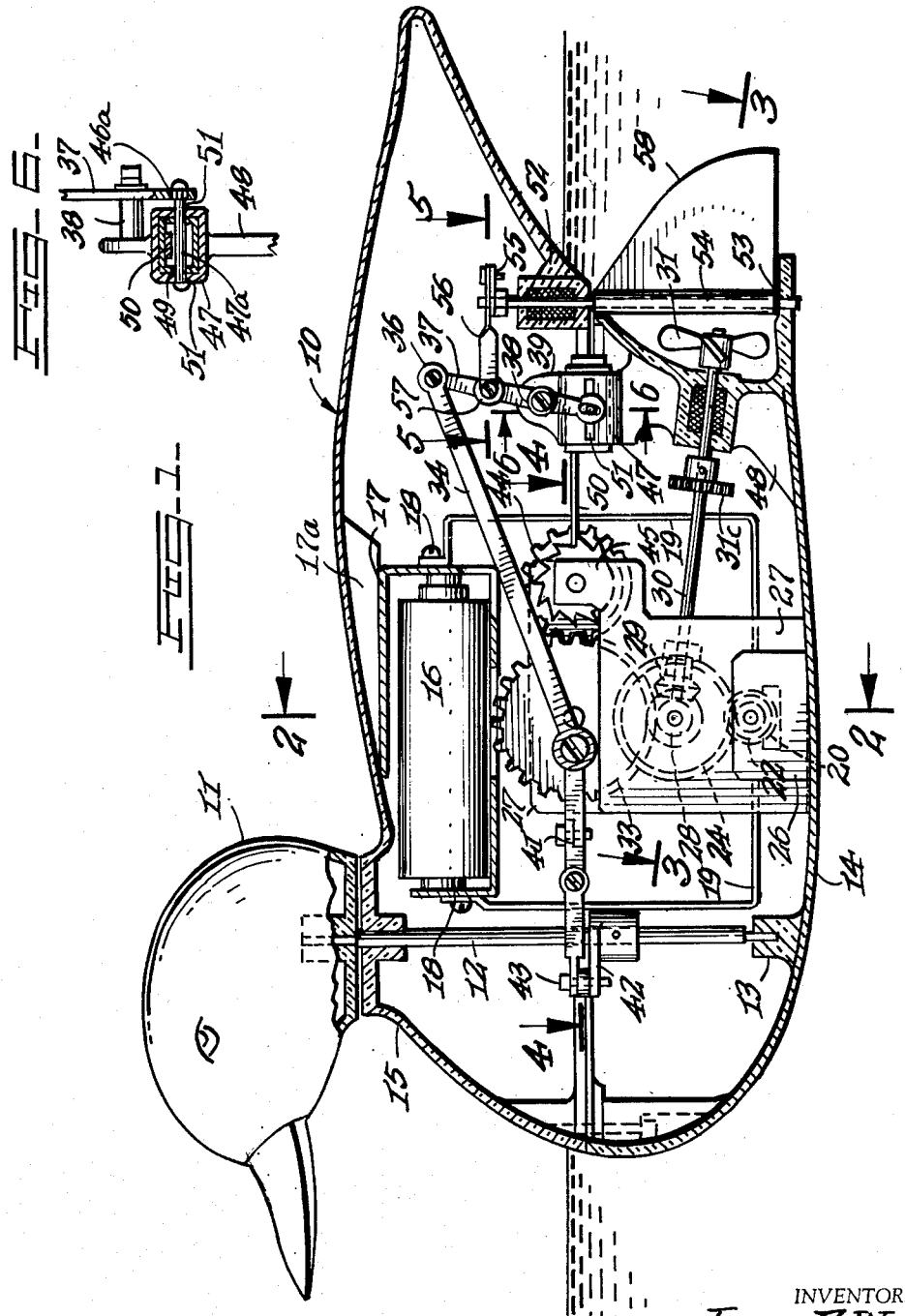
INVENTOR.
JAMES E. WEBB.
BY
J. Lederman
ATTORNEY.

May 20, 1958  J. E. WEBB  2,835,064
TOY OR DECOY BIRD OR ANIMAL
Filed July 24, 1956  2 Sheets-Sheet 2
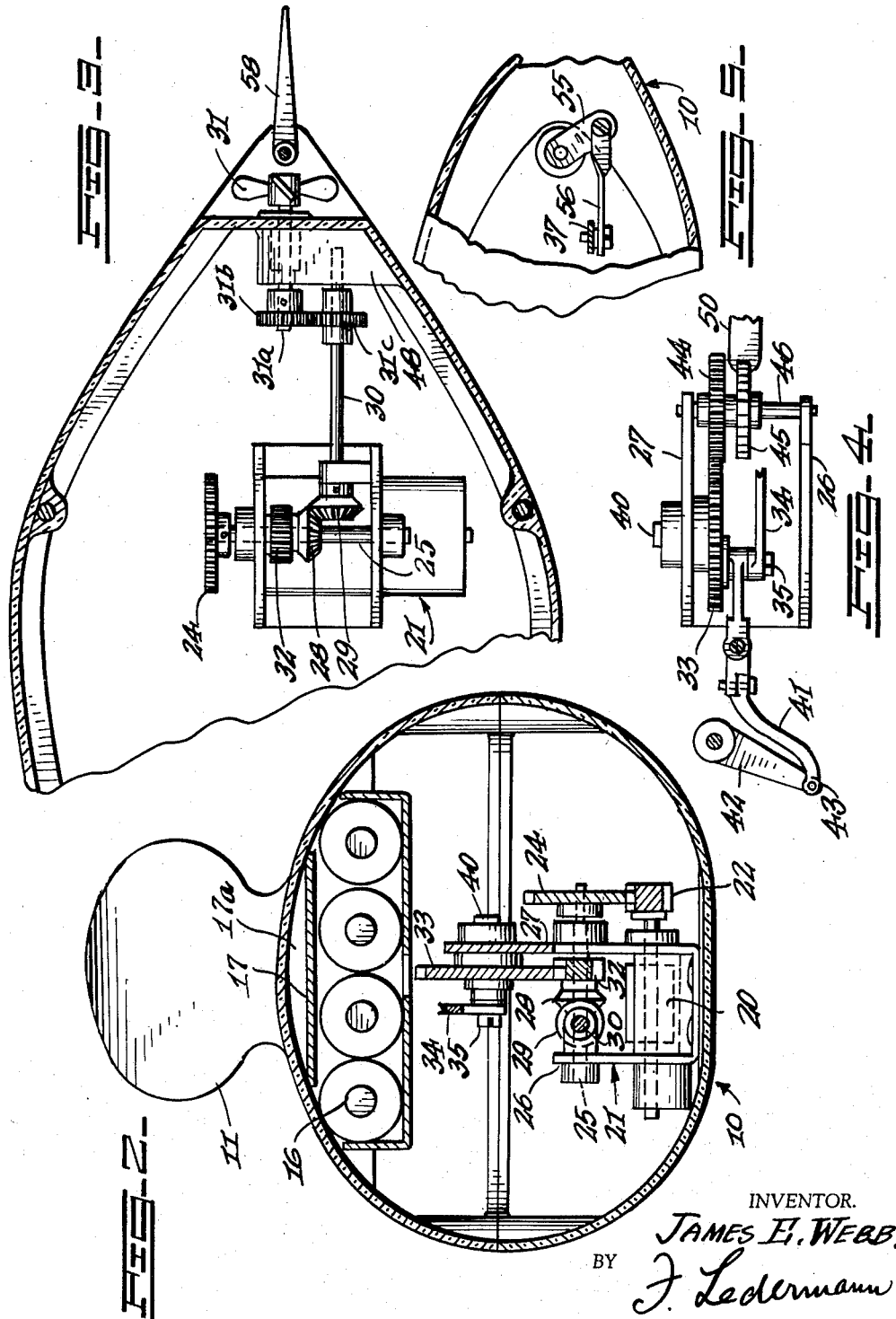
INVENTOR.
JAMES E. WEBB.
BY
J. Ledermann
ATTORNEY.

United States Patent Office 2,835,064
Patented May 20, 1958

2,835,064

TOY OR DECOY BIRD OR ANIMAL

James E. Webb, Houston, Tex.

Application July 24, 1956, Serial No. 599,886

5 Claims. (Cl. 43—3)

This invention relates to mechanical ducks or decoy or toy ducks, and the main object is the provision of certain new and useful improvements whereby the duck, which is adapted to float on water, simulates the movements of a live duck. When the duck is used as a decoy in hunting, its movements serve to attract wild ducks more effectively than the common type of decoy presently in use.

The above broad as well as additional and more specific objects will be clarified in the following description wherein reference numerals refer to like-numbered parts in the accompanying drawing. It is to be noted that the drawing is intended solely for the purpose of illustration and that it is therefore neither desired nor intended to limit the invention necessarily to any or all of the exact details of construction shown or described except insofar as they be deemed essential to the invention.

Referring briefly to the drawings,

Fig. 1 is a vertical longitudinal sectional elevational view through a mechanical duck embodying features of the present invention.

Fig. 2 is a sectional view taken on the line 2—2 of Fig. 1.

Fig. 3 is a sectional view taken on the line 3—3 of Fig. 1.

Fig. 4 is a sectional view taken on the line 4—4 of Fig. 1.

Fig. 5 is a sectional view taken on the line 5—5 of Fig. 1.

Fig. 6 is a sectional view taken on the line 6—6 of Fig. 1.

Referring in detail to the drawing, the numeral 10 indicates the hollow body in the form of a duck, having the head 11 fixed on a vertical rod 12 which is rotatably mounted in a trunnion 13 on the bottom 14 of the body and passes through the neck 15. A battery of cells 16 are supported in a frame 17 which includes a web 17a formed integral with the upper wall of the body, and through the usual contacts 18 leads 19 connect with an electric motor 20 mounted in a frame 21 secured to the bottom 14. Since an electric switch for the motor circuit would be conventional, no switch is shown in the drawing.

The motor shaft pinion 22 drives a gear 24 on a shaft 25 supported in the spaced vertical portions of members 26 and 27 of the frame 21. The shaft 25 carries a bevel gear 28 in mesh with another bevel gear 29 on the end of a long shaft 30 extending rearward through the body and having a propeller 31, on a parallel shaft 31a, driven through the gear 31b by the gear 31c. The shaft 25 also has a pinion 32 thereon in mesh with a gear 33. A long rod 34 has one end pivoted at 35 on a pin eccentric on the gear 33. The other end of the rod 34 is pivoted at 36 to one end of a lever 37, the latter being pivoted at 38 to a frame portion 39 supported by the body 10. The gear 33 is rotatably mounted on a shaft 40 in the portion 27 of the frame 21.

On the same eccentric pin 35 of the gear 33, one end of a rod 41 is pivoted, the other end being pivoted to a crank 42 at 43, the latter being relatively long and secured rigid on the rod 12. It is thus apparent that, as the gear 33 rotates, the rod or arm 41 in swinging between its extreme right and left positions, Fig. 1, swings the rod 12 back and forth through an arc proportional to the length of the crank 42, so that the head 11 of the duck will synchronously swing from side to side.

Rotatable in the frame portions 27 and 26 and in mesh with the gear 33 is a gear 44 having a ratchet-like wheel 45 rigid on the same shaft 46 as the gear 44. A hollow housing 47, rectangular in cross-section and open at both front and rear ends, is supported by or integral with the frame 48 secured to the body 10. A hollow sounding box of suitable material 49 is slidably mounted in the housing 47 and has a reed 50 anchored therein and extending forward and adapted, as will be described, intermittently to lie in the path of the teeth on the ratchet 45. If desired, the box or an equivalent member may be of solid construction, depending upon its material and the sound to be emitted; the purpose of the reed is to have a sound simulating the quack of a duck emitted each time the reed is set to vibrating by the ratchet teeth scraping the end thereof.

The lower end of the lever 37 has a longitudinal slot 46a therein, in which a pin 47a, rigid with the box 49, registers, this pin passing through aligned horizontal slots 51 in opposite sides of the housing 47. It is now apparent that for an interval during each cycle of the gear 33 owing to the movement of the rod 34, the reed 50 will be moved to the left in engagement with the ratchet teeth so that the reed will be vibrated or rasped to emit the duck sound.

Supported in journals 52 and 53, is an upright rod 54 having a crank 55 thereon, to which is pivoted one end of an arm 56 whose other end is pivoted to the lever 37 above the pivot 38, at 57. The rod 54 is imbedded in or secured to a rudder 58. It is thus apparent that as the arm 56 is moved longitudinally by the swinging lever 37, the crank 55 will swing the rod 54 and hence the rudder 58 back and forth through an arc. Thus, as the mechanism operates in propelling the duck, causing the head to swing back and forth, causing the duck sound to be emitted at intervals, the duck will also alter its course intermittently in opposite direction owing to the swinging of the rudder.

As a consequence of the mechanism described above, the toy or decoy duck will emulate a live duck on the water.

No attempt has been made herein to provide complete structural details by means of which the body and the mechanism therein may be assembled or taken apart, either in whole or in part, for replacement or adjustment of a part or of the electric cell, since such expedients are common and well known and have no bearing on the invention as herein presented. Moreover, a spring actuated motor could be used instead of the electric motor, if desired.

I claim:

1. A floating hollow body having a motor therein, said body having a head loosely mounted thereon, a vertical rod rotatably mounted in the body and having said head secured to the upper end thereof, said rod having a crank thereon, a train of gears connected with the motor, one of said gears having an eccentric pin thereon, an arm pivoted at one end thereof to said crank and at the other end thereof to said pin for swinging said head during rotation of said gears by the motor, a propeller for propelling the body on water, and means operatively connecting one of said gears with said propeller for actuation of the propeller during operation of the motor.

2. A floating hollow body according to claim 1, having a shaft rotatably mounted at right angles to the first named one of said gears, said shaft having a ratchet thereon and having a single gear thereon in mesh with the first-named one of said gears, a frame spaced from said ratchet, a reed holder slidably mounted in said frame on a line coincident with a diameter of the ratchet, said holder having a sound-emitting reed thereon extending substantially along said line toward the ratchet, and means operatively connecting said eccentric pin with said holder for alternately sliding the holder from an extreme position in which the reed engages the teeth of the ratchet to an extreme position in which the reed is clear of the ratchet teeth.

3. A floating hollow body according to claim 2, said holder comprising a hollow sounding box.

4. A floating hollow body according to claim 2, said last-named means comprising a lever pivoted between the ends thereof to said frame on an axis above said holder and having a longitudinal slot in the lower end thereof, a pin on said holder registering in said slot, a rod pivoted at one end thereof to said eccentric pin and at the other end thereof to the upper end of said lever.

5. A floating hollow body according to claim 4, having a rudder rigidly mounted on a substantially vertical shaft, a crank on said shaft, said shaft being rotatably mounted in said body, an arm pivoted at one end to said last-named crank and at the other end thereof to said lever at a point between the upper end of the lever and the pivot axis of said lever to said frame.

References Cited in the file of this patent

UNITED STATES PATENTS

| | | |
|---|---|---|
| 1,828,034 | Einfalt | Oct. 26, 1931 |
| 2,535,230 | Purdum | Dec. 26, 1950 |
| 2,575,252 | Berger | Nov. 13, 1951 |